(12) United States Patent
Al-Buaijan

(10) Patent No.: US 8,074,512 B2
(45) Date of Patent: Dec. 13, 2011

(54) PARTIAL STROKE TESTING SYSTEM COUPLED WITH FUEL CONTROL VALVE

(76) Inventor: Tareq Nasser Al-Buaijan, Yarmok (KW)

(*) Notice: Subject to any disclaimer, the term of this patent is extended or adjusted under 35 U.S.C. 154(b) by 277 days.

(21) Appl. No.: 12/038,830

(22) Filed: Feb. 28, 2008

(65) Prior Publication Data

US 2009/0222233 A1    Sep. 3, 2009

(51) Int. Cl.
*F16K 37/00* (2006.01)

(52) U.S. Cl. ........................................... 73/168

(58) Field of Classification Search ............... 73/1.72, 73/168
See application file for complete search history.

(56) References Cited

U.S. PATENT DOCUMENTS

| | | | | |
|---|---|---|---|---|
| 4,025,222 A | * | 5/1977 | Hedstrom et al. | 415/43 |
| 4,103,592 A | * | 8/1978 | Davis | 91/448 |
| 5,680,753 A | * | 10/1997 | Hollinger et al. | 60/779 |
| 6,244,034 B1 | * | 6/2001 | Taylor et al. | 60/776 |
| 6,435,022 B1 | * | 8/2002 | Albuaijan | 73/168 |
| 6,935,610 B1 | * | 8/2005 | DeBruyne | 251/93 |
| 2006/0012089 A1 | * | 1/2006 | Beck | 267/64.27 |

* cited by examiner

*Primary Examiner* — Hezron E Williams
*Assistant Examiner* — Nathaniel Kolb
(74) *Attorney, Agent, or Firm* — Richard C. Litman

(57) ABSTRACT

A system for on-line testing of an emergency shut-off valve includes a first emergency shut-off valve and a control for initiating a test on the first emergency shut-off valve. The system also includes a fluid actuator for opening and closing the first emergency shut-off valve. A subsystem is also provided for testing the first emergency shut-off valve without fully closing the shut-off valve in response to a signal from the control. In this system, a second solenoid valve bleeds off pressurized fluid to move the emergency shut-off valve from a fully opened to a partially closed position functions as a second emergency shut-off valve. A second emergency shut-off valve is also provided in series with the first emergency shut-off valve and a bypass around the second emergency shut-off valve allows the second emergency shut-off valve to be tested by being fully closed without shutting down the process. The use of the two emergency shut-off valves in series wherein either valve can shut down the process raises the safety integrity level to level 3.

1 Claim, 3 Drawing Sheets

PARTIAL STROKE TESTING SYSTEM COUPLED WITH FUEL CONTROL VALVE

FIELD OF THE INVENTION

This invention relates to a system for improving Safety Integrity Level (SIL) rating of process heaters using partial stroke testing of an emergency shut-off valve coupled to a supplementary fuel control valve.

BACKGROUND FOR THE INVENTION

In the oil, gas, petroleum and power industries, various conditions may occur that necessitate immediate shut down or tripping of the operations, process or plant. In those industries, a majority of the final control elements of a shut-off systems are implemented with fast acting shut-off valves. In such industries, a majority of the shut-off valves remain open while the process is in a safe and controlled state. Such valves are closed only upon a plant trip rising from an out of control process or during a normal maintenance outage.

In practice, the testing of emergency shut-off valves is normally done during shut down of the process. However, there is a tendency for such valves to stick or freeze due to corrosion or other reasons, which lead to an unsafe condition. This problem is exacerbated by economic conditions which have lead to a reduction in the frequency of shut-offs. For example, in some operations, a process may run continuously for one or more years without shutting down the process for maintenance.

State of the art emergency shut-off systems, which control the shut-off valves, have a number of features to detect plant or process failures and typically include redundancies for added reliability. However, such systems may not provide for the testing of shut-off valves itself other than stroking the valve. The problem is that full stroking or completely closing the valve causes an undesirable disruption in the process.

A U.S. Pat. No. 6,155,282 of Zachary et al. discloses an arrangement for testing solenoids individually without process interruption. The arrangement operates in a two out of three manner to provide relatively high safety, low spurious tripping and a relatively low installation cost, while also enabling on-line testing of each solenoid individually without process interruption. Solenoid arrangements are preferably manifolded to facilitate maintenance on any detected failure, and to simplify installation and replacement.

A more recent U.S. Pat. No. 6,920,409 discloses an apparatus for testing operation of an emergency valve. As disclosed, the apparatus for testing an emergency valve in which a valve member is moveable by a fluid operated actuator between a normal open or closed position and an emergency position closed or open respectively. The apparatus comprises partial stroking means including means for initiating emergency movement of the valve from its normal towards its emergency position, and means for returning it from a predetermined position intermediate the normal and emergency positions at its normal operating speed. The apparatus includes means for detecting the loss of the controlling electrical signal to the valve and a means for detecting the correct operation of the valve and its associated operating components by measuring the pressure of fluid being released from or being applied to the actuator.

In addition, a U.S. Pat. No. 7,010,450 of Law et al. discloses a combination of field device operations with overrides and bypasses within a process control and safety system. The process control or safety instrumented system uses function block logic to coordinate the logic within the process control or safety instrumented system with operational states of field devices, even when these operational states are initiated externally to the process control or safety system. Logic within input or voter function blocks associated with field devices may monitor and determine when the associated field devices are being put into testing or calibration modes and may automatically initiate appropriate bypass or override functionality in response to such detected field device configuration states. Likewise, the function block logic may automatically remove the bypass or override functionality when the field devices are placed back into their normal operational configuration states. This automatic initiation of bypasses and overrides helps to prevent a safety system within a process plant from initiating a shut-down procedure as a result of a device test initiated manually by, for example, a hand-held device attached to a field device. Likewise, the automatic removal of bypasses and overrides helps to prevent a safety system within a process plant from failing to operate properly because a user forgot to manually reset a bypass or override that was suet up to allow a device test.

Recognizing that the emergency shut-off valves can be stroked partially as a safeguard against frozen or stuck valves has lead to a need for a simple, secure and reliable system for testing such valves without adversely effecting production. This approach also improves the safety of the operation.

The partial stroke testing system in accordance with my earlier invention described in my U.S. Pat. No. 6,435,022, which is incorporated herein in its entirety by reference thereto, provides a low cost, simple and reliable test for emergency shut-off valves in the oil, gas, petrochemical and power industries. Such tests do not adversely interrupt a process and will minimize or almost eliminate the risk of a "frozen" emergency shutoff valve in the event of an out of control process. Such a system is cost effective and has been designed to utilize a shut-off valve with a fast acting piston actuator. The system is also applicable to slow acting valves.

In processes in the oil, gas, petroleum, and power industries, fuel to power the heaters, boilers, or the like, is fed to the associated burners through a fuel control valve and a fuel shut-off valve. The fuel control valve regulates pressure/flow to the burners, whereas the shut-off valve is normally in a fully open state. The shut-off valve closes to cutoff fuel supply in the event of an emergency.

From the safety point of view, the shutoff action of the shutoff valve is of utmost importance. The operability of the shutoff valve can be confirmed by means of the online valve partial stroke testing. However any failure in the internals of the shut-off valve may lead to a fuel leakage to the heater. Introduction of a solenoid valve in the pneumatic circuit of the fuel control valve driven by an emergency shut-off signal is conceived as a means for supplementing the fuel shutoff action and the redundancy to achieve up to Safety Integrity Level Three (SIL-3).

In addition, the partial stroke testing system in accordance with the present invention will not interfere with a plant trip, i.e. a full shut down due to an emergency condition. Furthermore, if a partial stroke test is being conducted at the time of a plant trip, the partial stroke test will contribute to a more rapid closing of the emergency shut-off valve. Thus, the partial stroking design acts as a backup to the main trip mechanism.

Accordingly, such systems should reduce the cost of insurance or risk coverage. In essence, the system partially closes the emergency shut-off valve to a predetermined position to test and confirm its ability to function and to ensure its availability on demand in the event of a plant emergency.

The present system design can be applied to design loop instrumentation (e.g. heater or boiler fuel loops, to piping loops, or to any separation between high pressure loops and low pressure loops) to achieve up to the Safety Integrity Level Three (SIL-3) in the final element (shutoff valve) part by using a regulator control valve as supplementary of second shutoff valve, as required by IEC (International Electrical and Electronic Commission)-61508 and ISA (Instrumentation, Systems, and Automation Society) S 84.01 standards.

TABLE 1

IEC 61598 Safety Integrity Levels

| Safety Integrity Level | Average Probability of Failure to Perform its Design Function on Demand |
|---|---|
| SIL-1 | $>10^{-1}$ to $\leq 10^{-2}$ (One failure in 11 to 100 demands) |
| SIL-2 | $>10^{-2}$ to $\leq 10^{-3}$ (One failure in 101 to 1000 demands) |
| SIL-3 | $>10^{-3}$ to $\leq 10^{-4}$ (One failure in 1001 to 10,000 demands) |

There is also a widespread concern among process operators about the Probability of Failure on Demand (PFD) of final shut-down elements, such as shut-off valves used in safety applications. Partial trip testing of the final shut-off valve couples with the supplementary emergency shut-off valve according to the present invention will serve to improve the PFD of shut-off action in such systems.

$$PFD_{1oo1} = \lambda_{du} \frac{Ti}{2} + \lambda_{dd}\left(MTTR + \frac{^TPITT}{2}\right)$$

| PFD | Probability of Failure on Demand |
|---|---|
| λdu | Undetected Failure Rate |
| λdd | Detected Failure Rate |
| MTTR | Mean Time To Repair |
| $^T$PITT | PITT testing Interval |
| Ti | Test Interval (Proof Test) |

BRIEF SUMMARY OF THE INVENTION

This invention relates to a system for improving Safety Integrity Level (SIL) rating or processes that employ burners fed by a fuel line using partial stroke testing of an emergency shut-off valve coupled to a supplementary fuel control i.e. a second emergency shut-off valve with a bypass for enabling the second emergency shut-off valve to be fully closed without interrupting the process. Such systems are particularly applicable in the oil, gas and petrochemical industries.

A programmable logic scheme performs the function of the partial stroke of the shutoff valves system and the closing of the shutoff valves and the control valves in the event of an emergency shut-off trip, to achieve up to Safety Integrity Level Three (SIL-3).

The system is designed for implementation on an emergency shut-off valve, which is normally movable between a fully opened and a fully closed position, and a fuel control valve. The fuel control valve regulates pressure/flow to the burners, whereas the shut-off valve is normally in a fully open state. The shut-off valve closes to cutoff fuel supply in the event of an emergency.

As contemplated by the preferred embodiment of the invention, the fuel control valve and emergency shut-off valve will be in their fully opened position during normal operation of a process, and both valves will rapidly close to shut down the process in the event of an emergency.

The system is designed for interfacing to the plant emergency shut-off system controller for generating electrical signals for initiating the test and to a source of pressurized gas such as compressed air for driving the system.

The essential control components of an emergency shut-off valve are the main trip solenoid valve with manual reset, quick exhaust valve and a fluid actuator. The control components of the fuel valve are a solenoid valve, and a fluid signal from the I/P converter to the actuator of the fuel control valve accomplishes the fuel regulating function.

On a trip signal, the solenoid valve de-energizes signaling the quick exhaust valve to vent the actuator and close the shut-off valve.

The invention provides a test means for testing the emergency shut-off valve without fully closing the emergency shut-off valve in response to a signal from the plant emergency shut-off system controller.

The test means includes a second solenoid valve for bleeding off compressed air to thereby move the emergency shut-off valve from a fully opened position to a partially closed position. Means such as closed limit switch which may be operable on the basis of the movement of the shut-off valve is provided.

Means such as a timer set to a predetermined time limit to terminate the shut-off valve test in the event of the limit switch failure is also provided.

In addition, means for initiating cyclical or periodical testing and reporting of test results of the partial stroking of the emergency shut-off valve is provided.

The invention will now be described in connection with the accompanying drawings.

DESCRIPTION OF THE PREFERRED
EMBODIMENTS OF THE INVENTION

It is well known in the oil, gas and petrochemical industries that emergency shut-off valves are susceptible to a build-up of frictional forces which if undetected can cause failure of the emergency shut-off valve during an out of control process. It is for this reason that the various regulatory agencies concerned with the safety of such operations, mandate periodic shut-off valve testing and inspection in order to ascertain shut-off valve availability.

As disclosed herein, a partial stroke test system tests an emergency shut-off valve on-line, i.e. without shutting down the process, for free movement over a small portion of its full stroke. Therefore, tests can be performed at frequent intervals. By so doing, there is a high probability of ensuring the emergency shut-off valve's operability, which reduces the likelihood of failure of an emergency shut-off valve during extended runs.

In the oil, gas and petrochemical industries, emergency shut-off valves generally remain open while the process is in a safe and controlled state. These valves close only upon a plant trip, which arises from an out of control process. The emergency shut-off valve typically includes a pneumatic cylinder which drives an emergency shut-off valve into a fully closed position within about one second.

Figure 1:
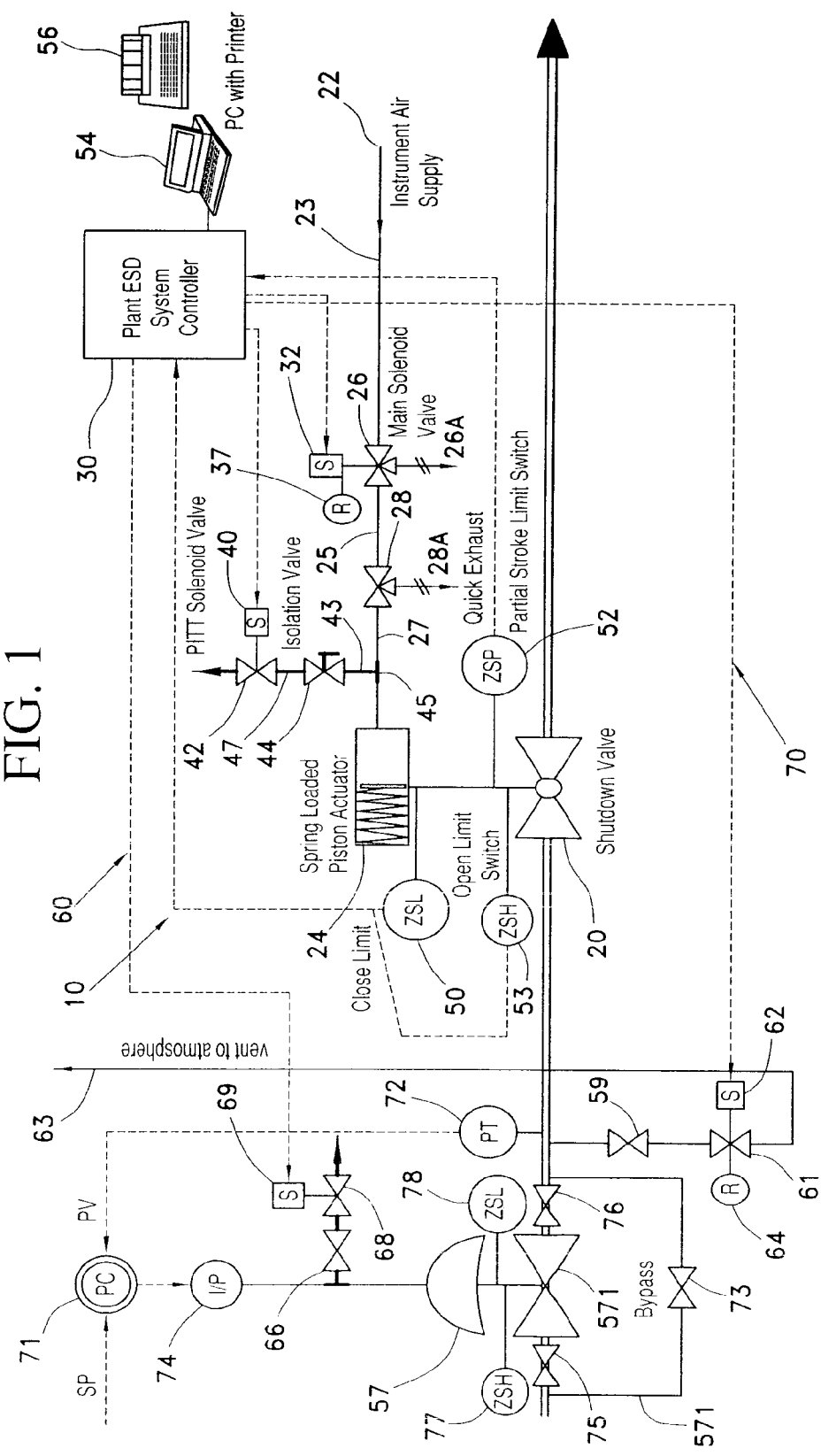
FIG. 1 is schematic illustration of a partial stroke testing of shutoff valve coupled with supplementary shutoff of fuel control valve in accordance with a preferred embodiment of the invention.

A partial stroke testing system 10, incorporated in a shut-off valve for use in the oil, gas, petrochemical and power industries is illustrated schematically in FIG. 1. Such system is incorporated in an emergency shut-off valve 20 which remains in an open position during normal process conditions. Compressed air from a source 22 is used for maintaining the valve 20 in an open position. The compressed air maintains the valve 20 in an open position by driving a spring biased piston actuator 24. The compressed air is connected with the spring biased actuator 24 through a main solenoid valve 26 and a quick exhaust valve 28. The source 22 of compressed air is connected to the main solenoid valve 26, quick exhaust valve 28 and actuator 24 by tubing 23, 25 and 27.

In the event of plant trip i.e. an out of control process, a signal as for example from plant emergency shut-off system controller 30 actuates a solenoid 32 which closes the main solenoid valve 26 with respect to the pressurized air from the source 22 and allows the air from tubing 25 to exhaust through an exhaust port 26A. The release of pressure against the quick exhaust valve 28 opens the exhaust port 28A allowing the actuator 24 to bleed through tubing 27, quick exhaust valve 28 and exhaust port 28A and close the shut-off valve 20 and thereby shut down the process or plant.

The partial stroke testing portion of the system 10 includes a second solenoid 40 and second solenoid valve 42. That portion also includes an isolation valve 44. The second solenoid valve 42 is operatively connected to the actuator 24 through tubing 47, isolation valve 44, tubing 43 and "T" connection 45 through tubing 27.

The trip event also energizes a third solenoid 69 by means of an electrical signal 60, which opens solenoid valve 68, to release the air pressure from the actuator of the control valve 57A, causing it to close the emergency shut-off valve 57. The trip event or electrical signal 70 from the emergency shut-off control also energizes a fourth solenoid 62, which opens solenoid valve 61 to bleed the gas trapped between the control valve 57 and the shutoff valve 20, and if there is any remote possibility of leak of the control valve to the flare system. A manual reset 64 is provided to prevent an auto start before reset during which operators of the unit check the field to restart.

Close limit switch (ZSL) 77 and open limit switch (ZSH) 78 indicate the opening and closing of the control valve 57A. During the trip event, close limit switch 77 will be on and open limit switch 78 will be off.

Isolation valves 59 and 66 provide isolation for solenoid valves 62 and 68, respectively, for maintenance requirements. The valves 59 and 61 are also connected to a vent 63 to the atmosphere.

Valves 75, 76, 73 are the bypass system to be used for any required maintenance of the control valve 57A, as well second emergency shut-off valve 57 during a full stroke test of the valve 57.

Process control (PC) 71 and current to pressure converter (IIP) 74 and pressure transmitter (PT) 72 are part of the control process loop used in the petrochemical and power plant industries.

A key feature of the present invention resides in the use of the second emergency shut-off valve 57 and a bypass 571. In practice, the second emergency shut-off valve 57 is provided in the system and is in series with the first emergency shut-off valve 20 and can be isolated from the system by the bypass 571 for fully stroking a second emergency shut-off valve 57. Valves 73, 75 and 76 are used to bypass the second emergency shutoff valve so that the second emergency shutoff valve 57 can be fully stroked without shutting down the system. In such cases, the first emergency shut-off valve 20 fully protects the system in the event of an emergency. At the same time, when the first emergency shut-off valve 20 is being tested, the second emergency shut-off valve 57 protects the plant or system in the event of a true emergency.

For a partial stroke test, a signal from the plant emergency shut-off system controller 30 energizes the second solenoid 40 which opens the second solenoid valve 42 to bleed off compressed air so that the spring biased actuator 24 partially closes the shut down valve 20. This partial closing is limited by partial stroke limit switch 52, which sends a signal to plant emergency shut-off system controller 30 in a conventional manner. The plant emergency shut-off system controller 30 de-energizes the solenoid 40 to thereby close the second solenoid valve 42 and the shut-off valve returns to fully open state. By limiting the movement of the shut down valve 20 by time or stroke, there is no interruption of the process. Nevertheless open limit switch 53 and partial stroke limit switch 52 provide signals to the plant emergency shut-off system controller 30 that the valve actually moved which indicate it is not frozen or stuck. Suitable sensing means such as a linear variable transducer can also be used to check that the valve 20 has in fact been displaced in response to the signal from the plant emergency shut-off system controller 30. If the linear variable transducer indicates that a preselected degree of deflection has occurred, the valve tested has been shown to be free to move.

However, if the sensing means indicate that the deflection has not occurred, a signal is sent to the plant emergency shut-off system controller 30 indicative of the fact a suitable alarm is provided to indicate that the valve is stuck and to initiate corrective action.

The magnitude of the displacement may be any suitable degree to positively indicate that the valve movement is possible, but must not be of such magnitude as to disrupt the process or the plant operation and will ordinarily be accomplished in few seconds or less.

The plant emergency shut-off system controller 30 may be interfaced to a computer 54 to initiate periodic partial stroking of the shut-off valve 20. The computer 54 is also used to record the results of each test, which may be printed out on a printer 56. The isolation valve 44 isolates the second solenoid valve 42 from the shut-off valve system for maintenance without affecting the operation of the shut-off valve.

The manual latch facility 37 in the main solenoid valve allows the operators to manually open the shut-off valve, after field verification, subsequent to a trip and reset of the trip signal.

Figure 2:
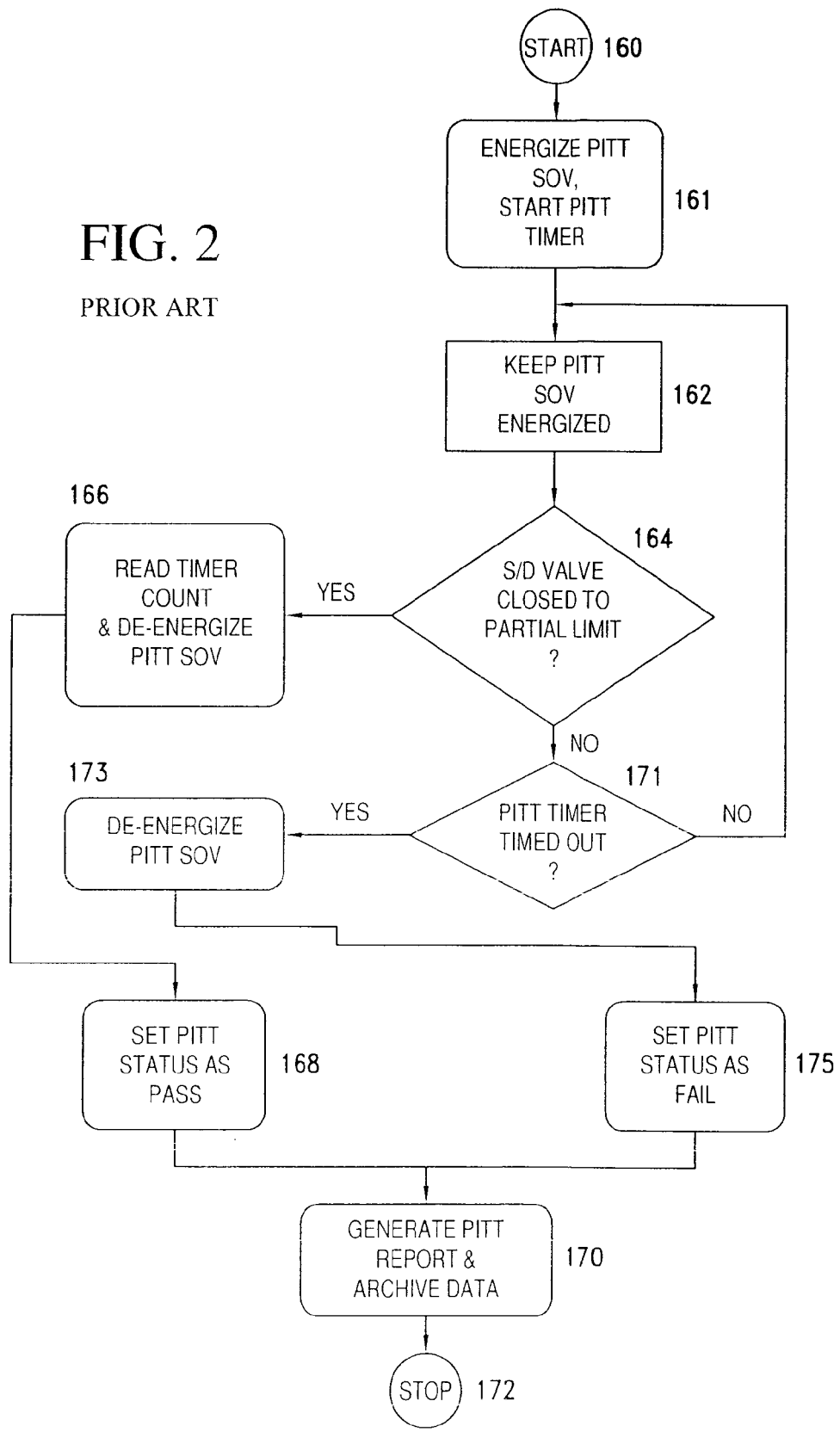
FIG. 2 is a flow chart, which illustrates the operation of a partial stroke testing system software, residing in the plant emergency shut-off system controller, in accordance with the present invention.

The control sequence, for conducting the partial stroke test of the first shut-off valve 20 (FIG. 1), programmed into the plant emergency shut-off system controller 30 (FIG. 1) is illustrated in FIG. 2. The Partial Instrument Trip Testing (PITT) or partial stroking of the shut-off valve is initiated by the plant emergency shut-off system controller 30 (FIG. 1) by initiating the execution of the program sequence illustrated in FIG. 2. Starting at step 160 the plant emergency shut-off system controller 30 (FIG. 1) energizes power supply to the solenoid 40 (FIG. 1) of the solenoid valve 42 (FIG. 1) and start an internal timer as indicated in step 161. On energization of the solenoid 40 (in FIG. 1), the solenoid valve 42 (FIG. 1) opens and bleed the actuator air supply causing the actuator 24 (in FIG. 1) to move the shut-off valve 20 (FIG. 1) towards the closed position.

The shut-off valve movement to partial limit is checked in step 164. If the shut-off valve 20 (FIG. 1) has reached the partial limit, the program sequence proceeds to step 166 to de energizes the solenoid 40 (in FIG. 1) to close the solenoid valve 42 (FIG. 1) and to stop the timer. The actuator 24 (FIG. 1) on closure of the solenoid valve 42 (in FIG. 1) gets full air supply and drives the shut-off valve 20 (in FIG. 1) to fully open position. The program sequence then proceeds to step 168 to set the status of the test as pass and to step 170 for generating test report and archiving of test data. After generating the test report and archiving the test data, (valve Tag. No, test status and test duration), the test control sequence is terminated at step 172 and diverted to other applications in the plant emergency shut-off system controller 30 (FIG. 1)

In the event that the shut-off valve has not closed to its partial limit in step 164 and the test timer (PMT timer) has not timed out as in step 171, the control sequence returns to step 162 and loop through steps 164 and 171 until either the valve reaches the partial limit or the PITT timer time out.

In the event that the shut-off valve has not closed to its partial limit in step 164 and the test timer (PITT timer) has timed out as in step 171, the control sequence goes to step 173 to de energizes the solenoid 40 (FIG. 1) to close the solenoid valve 42 (FIG. 1). The actuator 24 (FIG. 1) on closure of the solenoid valve 42 (FIG. 1) gets full air supply and drives the shut-off valve 20 (FIG. 1) to fully open position. The program sequence then proceeds to step 175 to set the status of the test as fail and to step 170 for generating test report and archiving of test data. After generating the test reports and archiving the test data, (valve Tag. No, test status and test duration), the test control sequence is terminated at step 172 and diverted to other applications in the plant emergency shut-off system controller 30 (FIG. 1).

Figure 3:
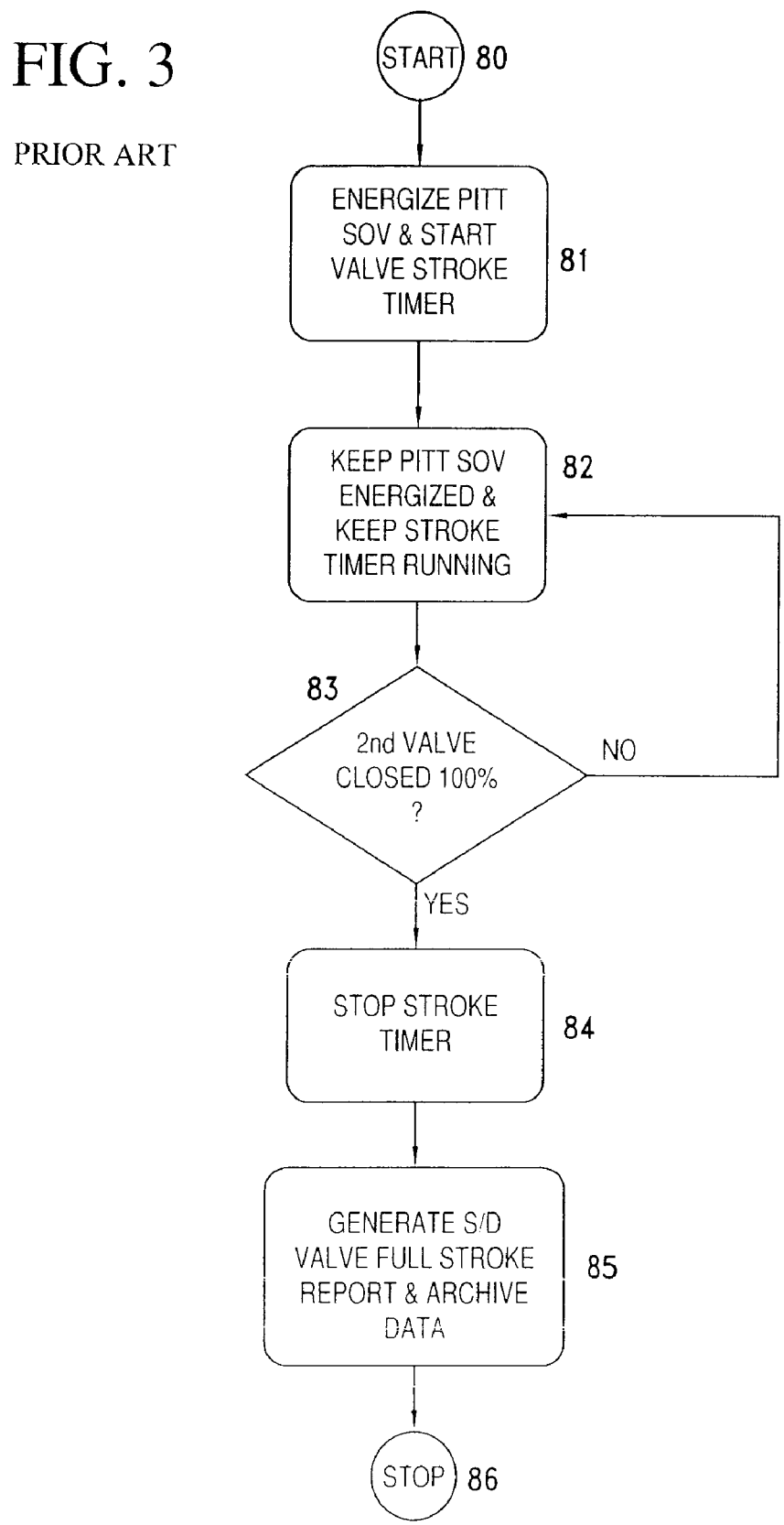
FIG. 3 is a flow chart, which illustrates the operation of the software, residing in the plant emergency shut-off system controller, controlling the partial stroking means in the event of an emergency trip signal from the plant emergency shut-off system controller in accordance with the present invention.

A bleed enhancement scheme in accordance with one embodiment of the invention is illustrated in FIG. 3. The bleed enhancement is achieved by implementing the control scheme as indicated in FIG. 3 in the plant emergency shut-off system controller 30 (FIG. 1) as an application program routine. The program is initiated in the event of an emergency trip signal at step 80. On an emergency trip, plant emergency shut-off system controller 30 (FIG. 1) issues a trip signal to de-energizes the main solenoid valve 26 (FIG. 1), energizes the PITT solenoid valve 42 (FIG. 1) and starts a valve stroke timer as in step 81. The PITT solenoid valve 42 (FIG. 1) will remain energized and the valve stroke timer continue to run as indicated in step 82 until the shut-off valve is fully closed as in step 83. Up on full closure of the shut of valve the timer is stopped as in step 84. The plant emergency shut-off system controller 30 (FIG. 1) will then generate a full stroke report and archive the valve stroke time data as in step 85. Upon completion of the report generation and data archiving task the control sequence is terminated at step 86 and divert to other applications in the plant emergency shut-off system controller 30 (FIG. 1).

The PITT solenoid valve 42 (FIG. 1) will remain energized until the trip is reset. The additional bleed introduced by the solenoid valve 42 (FIG. 1) will enhance the shut-off performance of the shut-off valve.

A partial stroke testing system for on line testing of emergency shut off valves can also implemented as a portable self contained test apparatus for conducting partial stroke test on shut off valves which are controlled by non-programmable shut-off system.

While the invention has been described in connection with its preferred embodiments, it should be recognized that changes and modifications may be made therein without departing from the scope of the appended claims.

What is claimed is:

1. A partial stroke testing system for improving safety integrity level (SIL) rating, comprising:

an emergency shut-off valve;

an emergency system shut-off controller means for initiating an electrical signal for initiating a test on said emergency shut-off valve;

means for initiating a partial stroke test manually or at programmed intervals from a computer interface to said control means and to generate a printed report of test results;

means for monitoring the full stroke travel time of said emergency shut-off valve in the event of emergency closure of the said emergency shut-off valve as a result of a trip signal from said control means;

a source of pressurized gas and a main solenoid responsive to said electrical signal from said emergency system shut-off controller means;

a main solenoid valve and a quick exhaust valve connected to said source of pressurized gas and a pneumatic actuator for opening and closing said emergency shut-off valve;

wherein said system bleeds pressurized gas from the pneumatic actuator during partial stroke checking of said emergency shutoff valves;

wherein said system bleeds pressurized air from the system during emergency closure (trip) of the said emergency shut-off valve to enhance the bleed rate and act as a backup to the main solenoid valve and quick exhaust valve in the event of unsafe failure to the said main solenoid valve and quick exhaust valve;

test means for testing said emergency shut-off valve without fully closing said emergency shut-off valve in response to a trip signal from said emergency system shut-off controller means, said test means including a second solenoid;

a second solenoid valve for bleeding off pressurized gas to thereby move said emergency shut-off valve from a fully opened position to a partially closed position;

an isolation valve between said second solenoid valve and said pneumatic actuator for isolating the said second solenoid valve from the rest of the system;

a control valve for throttling and regulating fuel pressure operably connected in series with said emergency shut-off valve and controlled by said emergency system shut-off controller means, said control valve operating as a second emergency shut-off valve during shutdown or an emergency state;

a control sequence programmed into said control means for initiating a partial stroke test on said shut-off valve;

backup means for terminating the partial stroke test including a timer programmed into the partial stroke testing system controller;

a third solenoid valve operable by said electrical signal for releasing air pressure from said control valve;

a fourth solenoid valve for bleeding gas trapped between the said control valve and said emergency shut-off valve;

wherein isolation valves are provided to isolate the third and fourth solenoid valves;

a manual reset means preventing inadvertent manual opening of the said emergency shut-off valve, subsequent emergency closure of the said emergency shut-off valve as a result of said trip signal from said emergency system shut-off controller means and prior to reset of said trip signal from said emergency system shut-off controller means;

means for limiting the movement of said emergency shut-off valve to a partially closed position as a result of the bleeding off of pressurized gas;

means for detecting actual movement of said emergency shut-off valve;

in which the means for detecting the movement of said emergency shut-off valve is a limit switch; and wherein the opening and closing of the control valve is indicated by a close limit switch and an open limit switch.

* * * * *